April 1, 1969     I. BROWNING ET AL     3,435,667
MEASURING METHOD AND APPARATUS
Filed Aug. 25, 1965
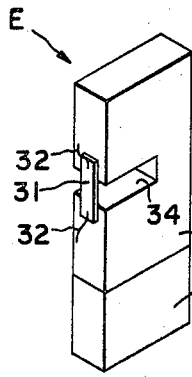
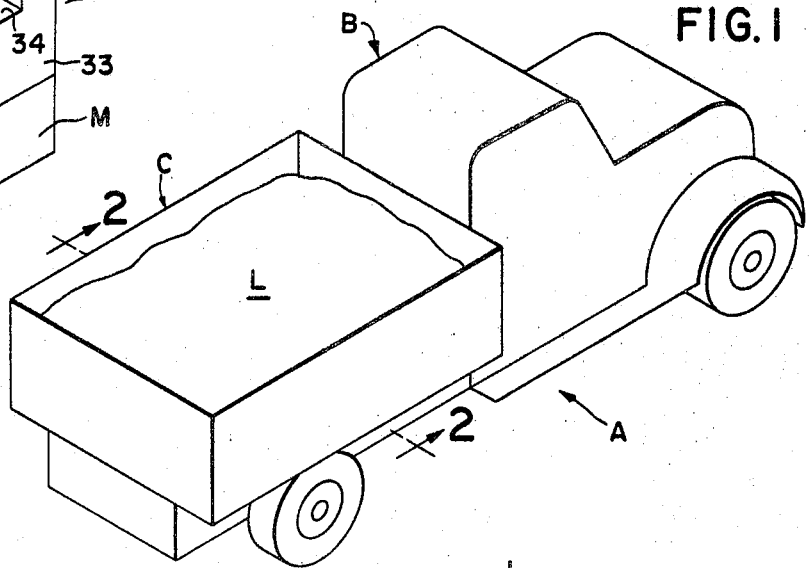
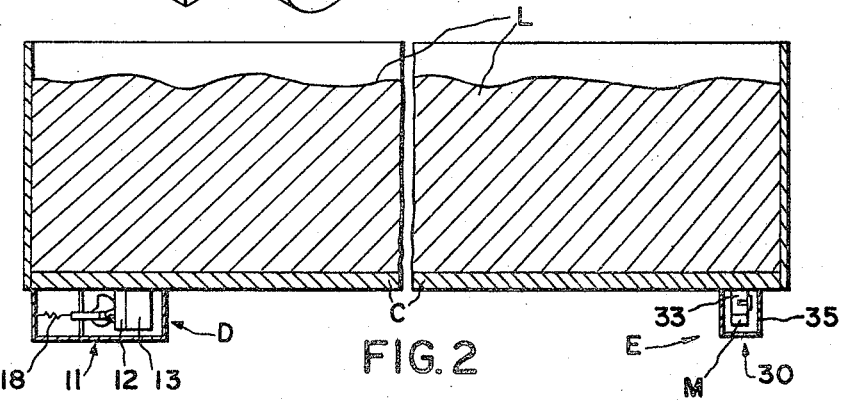
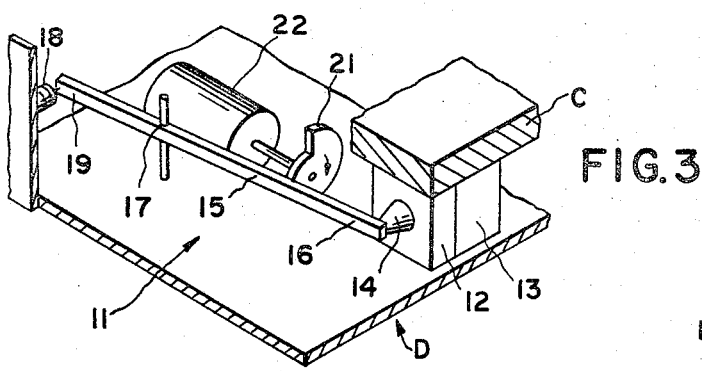
INVENTORS
IBEN BROWNING
WILLIAM J. GEIGER
EDWARD R. STRAND
BY Townsend and Townsend
ATTORNEYS April 1, 1969  I. BROWNING ET AL  3,435,667
MEASURING METHOD AND APPARATUS
Filed Aug. 25, 1965  Sheet 2 of 2
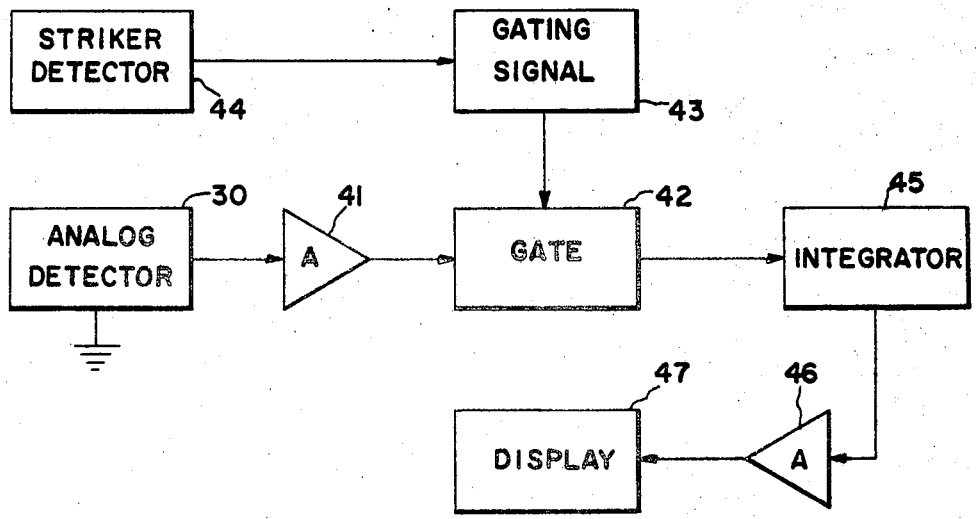
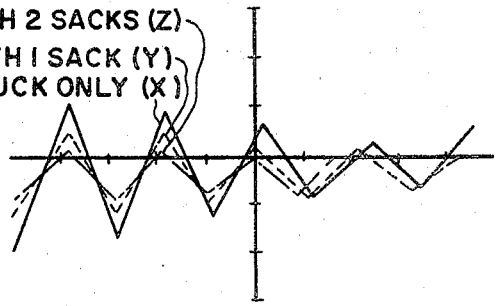
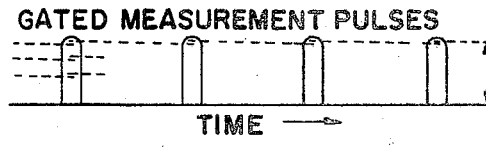
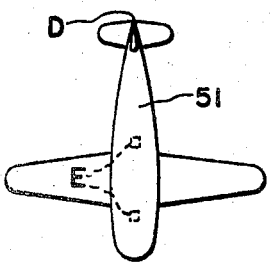
INVENTORS
IBEN BROWNING
WILLIAM J. GEIGER
EDWARD R. STRAND
BY Townsend and Townsend
ATTORNEYS United States Patent Office 3,435,667
Patented Apr. 1, 1969

3,435,667
MEASURING METHOD AND APPARATUS
Iben Browning, Sunnyvale, Calif. (1052 Pomeroy Ave., Santa Clara, Calif. 95051); and William J. Geiger, 1320 Pear Ave., and Edward R. Strand, 2532 Fairbrook Drive, both of Mountain View, Calif. 94040
Filed Aug. 25, 1965, Ser. No. 482,357
Int. Cl. G01m 1/12
U.S. Cl. 73—65
4 Claims

ABSTRACT OF THE DISCLOSURE

A load-carrying vehicle weighing apparatus and method are disclosed wherein an impulse is imparted to the load-carrying vehicle bed by a fast push having a period such that the entire vehicle bed and responsive load moves substantially as a single unit. A detector provided on the vehicle measures the displacement of the load during the fast push thereby to provide a measure of the weight of the load.

---

The present invention is directed to method and apparatus for determining the physical characteristics of a given object and more particularly to method and apparatus for determining the weight and/or center of mass of objects by measuring the inertial mass responsive to a fast push applied to the object.

There presently exists a need for an accurate measuring device for determining weight and/or center of gravity of loads imposed on transporting vehicles. By way of example, definitive laws exist on the permissible loads carried by trucks on state and national highways. These load limits are strictly enforced with heavy fines imposed for violations. To the trucks or company hauling loads by truck, each additional pound of weight that can be hauled with the load is important from a cost and profit basis, primarily since the cost in transporting additional weight over a given weight is nominal compared with the cost in transporting this same weight in a separate load. Therefore, while it may be costly to a trucker to pay a fine for weight carried in the vehicle beyond the legal limit, it is equally as costly to the trucker not to carry a load sufficiently close to the legal limit as to make as great a profit as possible on the particular trip. Therefore, a fast, accurate weighing device which can readily inform the trucker when his load reaches the legal limit is desired. It is customary to weigh the truck on a scale and change the load if the desired legal gross weight is not achieved. This technique is naturally costly in loading time for the loading crew, the driver, and the weight man while the truck waits in line under the loading chute.

One system that has been proposed for providing a load-weighing system has been a factory installed weighing system incorporated in the truck which employs a plurality of pneumatic cylinders spaced about and supporting the load-supporting bed and which are adapted to measure the load applied to the bed. Naturally, such a system is extremely costly when it is considered that the pneumatic cylinders must support the entire weight of the load which may run into many tons.

Another technique which has been proposed such as described in U.S. Patent No. 2,305,783 to Heymann is to oscillate a loaded structure and measure the amount of damping of the oscillations due to the weight of the load. This method and apparatus is undesirable since it relies upon springs to support the load and it is well known that springs, especially when utilized with loads of numerous tons as in the present instance, will fatigue and take a set during aging. Furthermore, the operative effect of springs is not a linear function but rather varies with the compression of the springs. Also, in order to obtain a meaningful reading of the load damping effect to observe reasonable differences in load weight, an extremely strong force must be applied to the load to establish the oscillations. Another important drawback to the use of oscillating systems lies in the fact that many trucks presently on the highway do not have springs for supporting the load-carrying bed so as to accommodate an oscillating system.

In accordance with the present invention the weight of a responsive load on a truck bed can be determined by applying to the truck bed a fast push which has a period such that the entire truck bed and responsive load move substantially as a single unit. By way of example, in the case of a truck bed with the fast push directed transversely of the truck bed the desired wave length for the fast push is to conform to a wave length equivalent to a wave length greater than twice the transverse dimension of the truck bed so that during the half cycle of the push the entire truck bed and responsive load is in motion. With the fast push applied to the truck bed the response of the bed and responsive loads thereon can be detected and measured in terms of the inertial mass responsive to the push and more particularly in terms of the weight of loads imposed on the bed and responsive to the push.

One of the features and advantages of the present invention lies in the fact that the method and apparatus in accordance with the present invention can be applied to any load-supporting member such as a vehicle truck bed, railroad car, airplane frame, and the like whether spring mounted or not, and the weight of the responsive load applied thereto readily determined. The method and apparatus in accordance with this invention operates with such little movement of the truck bed and responsive load as to require very little energy for creation of the fast push and very little time required for the detection and registration of the effect of the fast push.

In accordance with another aspect of the present invention the fast push applied to trucks to be weighed is directed transversely of the truck bed so as to effect substantially only the truck bed and responsive loads without being transmitted to the cab and engine of the truck as would be the case if the fast push were directed longitudinally of the truck.

Additionally, the method and apparatus in accordance with the present invention can be utilized to determine the center of gravity of the carrying vehicle and responsive loads. This information can be extremely critical such as, for example, in determining the weights of loads utilized in air transports where a knowledge of the center of gravity is extremely important for proper takeoff, flying and landing of the aircraft.

In accordance with this latter aspect of the present invention the effects of the fast push on the vehicle and responsive loads are detected at two spaced apart locations on the body, each of which location is spaced from the position of application of the push. By balancing out the angular rotation of the object at the spaced apart locations, the center of gravity of the unit can easily be located.

Other objects and advantages of this invention will become apparent when reading the following description and referring to the accompanying drawings in which similar characters of reference represent corresponding parts in each of the several views.

In the drawings, FIG. 1 is a schematic perspective view of a truck equipped with a measuring device in accordance with the present invention;

FIG. 2 is a cross-sectional view of a portion of the structure shown in FIG. 1 taken along line 2 in the direction of the arrows;

FIG. 3 is a perspective view of a portion of the structure illustrated in FIG. 2 and delineated by line 3—3;

FIG. 4 is a perspective view of a portion of the structure shown in FIG. 2 and delineated by line 4—4;

FIG. 5 is a block diagram illustrating one circuit utilized for accomplishing the present invention;

FIGS. 6A, B, C and D are curves illustrating the operation of the present invention with reference to particular portions of the circuit illustrated in FIG. 4; and FIG. 7 is a schematic illustration of the application of the present invention to the location of the center of mass of a body.

While the present invention is particularly applicable for determining the weight of responsive loads on trucks and will be described with particular reference thereto, it will be appreciated that the invention is equally applicable to measurement of loads on other vehicles such as cars, trains, airplanes, boats, etc., and even loads imposed on non-transporting structures such as loading docks and the like.

Referring now to the drawing with particular reference to FIGS. 1 and 2, there is illustrated one embodiment of the present invention wherein a truck generally designated A having a cab B and a load-supporting bed or dump C supporting a bulk load L is provided with a fast push generating assembly D located along one lateral edge of the bed C and a detecting assembly E located along another lateral edge of the bed C.

The fast push generating assemby D includes a trip hammer 11 for striking a yielding elastic member 12 rigidly secured to the bed C as by a metal block 13. The trip hammer 11 is arranged for striking the yielding elastic member 12 with a force directed transversely of the truck bed or from one lateral side of the bed to the other side of the bed normal to the longitudinal axis of the truck passing through the cab B, toward or nearly toward the center of gravity of the loaded bed. As illustrated, the trip hammer 11 can be located underneath the truck bed C in order not to increase the overall width of the truck and includes a striker 14 mounted on one end 16 of an arm 15 pivoted for movement about a pin passing through the arm 15 between the ends thereof. A spring 18 is connected to the other end 19 of arm 15 to rotate the arm about the pin 17 for causing the striker 14 to impact against the yielding member 12. The arm 15 is raised out of contact with the yielding elastic member 12 and then released by a jumping cam 21 driven by a motor 22 with the jumping cam 21 engaging the arm between the pin 17 and the one end 16 of the arm 15.

The characteristics of the striker 14, the yielding elastic member 12, and the spring 18 are selected so as to produce a fast push against the truck bed C. The term "fast push" is utilized herein and in the claims to define an applied force having a period sufficiently long that the entire object, which in this case is the truck bed C and responsive load L, moves substantially as a single unit. Stated in another manner, when the fast push is considered as a cyclical action, the push is characterized by a wave length equivalent to a wave length greater than twice the dimension of the object or platform in the direction of the push.

By way of example, with a truck which is on the order of eight feed wide the wave length of the fast push is equivalent to a wave length greater than 16 feet and preferably on the order of 30 to 50 feet. The actual amount of displacement produced by the strking of the trip hammer against the yielding elastic member with a fully loaded truck is less than the amount of displacement produced by an individual pushing the truck steadily with his finger.

A striking trip hammer can achieve any given displacement at useful wave lengths with an amount of energy expenditure and equipment weight that is small compared with the energy expenditure and equipment weight that would be required in an oscillating system as disclosed in the Heymann patent referred to above. This difference in energy expenditure and equipment weight at useful wave lengths (i.e., frequency response) is such as to render the striking trip hammer device practicable both technically and economically.

The detection assembly E spaced from the push generating assembly D and separately and firmly attached to the load bed includes an analog detector 30 and apparatus for measuring the detected effect of the push in terms of the inertial mass responsive to said push. The detector 30 includes a conductive chip 31 of, for example, germanium connected via leads 32 in the measuring circuit, to be described below, and rigidly secured to a main body member 33 such as germanium to which is attached in inertial mass M in such a way as to permit tension and compression to be applied to the chip corresponding to the force acting on the body 33 by movement of the load bed with respect to intertial mass M. In the embodiment illustrated the chip 31 extends across and is anchored on opposite sides of a transverse slot 34 cut part way through the block 33. One end of the body member 33 is rigidly secured to the bed C of the truck within a housing 35 on the lateral side thereof opposite the fast push generating assembly D.

The fast push applied to the bed C results by differential movement of the truck bed and inertial mass M in a bending of the body member 33 thereby changing the resistivity of the strip 31. The degree of change in the resistance of strip 31 in indicative of the amount of relative motion in the inertial mass responsive to the fast push. Since the body 33 is a crystal it will not fatigue with time and repeated fast pushes. Typically, a bracket member (not shown) surrounds the free end of the body member 33 and inertial mass M to permit a completely free but limited range of movement of the free end of the body member 33 corresponding with the movement produced by the fast push on an unloaded truck so that in case of stronger vibrations or blows applied to the truck the body member 33 is not damaged. The circuitry connected to the chip 31 may be located at the housing 35 or in the cab of the truck for display of the output load weight reading.

Referring now to FIG. 5 the analog detector 30 including the resistance strip 31 is connected in a circuit with an amplifier 41 for passage of the signal (schematically illustrated in FIG. 6A) received from the analog detector 30 through a gate 42 which passes only the first output pulse generated by the detector 30 in response to each blow of striker 14. The amplifier 41 is tuned to filter out typical truck engine vibrations and to pass the frequency produced by striker 14 when it strikes yielding elastic member 12. The gate 42 is operated by a gating signal designated 43 and schematically illustrated in FIG. 6B which can be produced from a piezoelectric crystal located between the yielding elastic member 12 and the block 13. The gate 42 is connected to an integrator 45 which takes a running average illustrated in FIG. 6D of a series of gated pulses passed through gate 42 as measures of the displacements produced by a series of generated fast pushes. The output from integrator 45 and which is schematically illustrated in FIG. 6D is passed through an amplifier 46 to a display 47 in the form of a meter, scope or indicator lights.

The operation of the circuit schematically illustrated in FIG. 5 is illustrated in FIGS. 6A, B, C and D wherein FIG. 6A illustrates three different signals received from the analog detector 30 for three different loading conditions of the truck A. The first pulse signals produced at the output of the analog detector are highest for the unloaded truck and are correspondingly reduced when the truck load responsive to the fast push is increased. The gated signals shown in FIG. 6C illustrate the signals for the detector load signals illustrated in FIG. 6A.

Obviously, many changes can be made in the actual fast push producing apparatus and the detection apparatus without departing from the scope of the present invention.

As thus far described, a fully useful disclosure has been set forth which may be practiced by anyone skilled in this art and having a knowledge of electrical circuitry. However, in order to illustrate the invention more fully and give further guidance for the complete utilization of the invention, the following illustrative example is given. For a 6,000 lb. truck a trip hammer weighing approximately 2 lbs. and struck against a rubber elastic member approximately 1½ inches thick was utilized to apply a fast push to the truck bed and produce a movement of the bed of less than 1 mil. With a detection circuit generally as indicated in FIG. 5 signals such as illustrated in FIG. 6A were produced on an oscilliscope by applying 30 strokes fast push first with the truck empty, then by adding one and then two 94 lb. sacks of cement. With this construction it was also possible to observe differences in load on the order of plus or minus 400 lbs. when a truck was fully loaded with a load of several thousand pounds.

While the present invention has been described thus far with reference to measuring the weight of responsive loads in trucks, it will be appreciated that it is equally applicable to measuring weights in other vehicles such as, for example, an airplane which may contain a load grossing about 300,000 lbs. and wherein it is desired to measure the load to within 1,000 lbs. In such case the fast push can be directed longitudinally of the main fuselage of the airplane for measuring the weight of loads in the airplane responsive to the fast push.

As another aspect of the present invention the fast push can be utilized to locate the center of gravity of a member such as, for example, an airplane. Thus, as illustrated in FIG. 7, instead of directing the fast push longitudinally of the airplane 51 the push can be applied substantially normal to the longitudinal axis of an airplane by a fast push generating assembly D at one end thereof such as at the tail and detectors E provided at two or more spaced apart locations on the frame of the airplane 51 remote from the assembly D. By measuring the angular rotation of the airplane frame with these detectors E the center of gravity of the object can be derived.

Although the foregoing invention has been described in some detail by way of illustration and example for purposes of clarity of understanding, it is understood that certain changes and modifications may be practiced within the spirit of the invention as limited only by the scope of the appended claims.

What is claimed is:
1. A measuring device for determining the response by an object to a force comprising means for producing a fast push to said object, said push directed to a certain portion of said object and the period of the push such that the entire object moves substantially as a single unit, means secured to the object and spaced from said certain portion of said object for detecting the velocity of displacement of said object and any responsive load thereon and means measuring the detected effect of said push on said object in terms of the inertial mass responsive to said push.

2. A measuring device for determining the response by an object to a force comprising means for producing a fast push to said object, said push directed to a certain portion of said object and the period of the push such that the entire object moves substantially as a single unit, means secured to the object and spaced from said certain portion of said object for detecting the effect of said push on said object and means measuring the detected effect of said push on said object in terms of the inertial mass responsive to said push, said detecting means including a pair of detectors secured to said object at spaced apart locations for detecting at said spaced apart locations the effect of said push on said object, said measuring means measuring the detected effect at said spaced apart locations of said push on said object in terms of the angular movement of said object and responsive loads mounted thereon thereby to locate the center of mass of said object and responsive loads.

3. A measuring device for measuring the weight of loads imposed on the bed of a truck comprising means secured at one lateral side of the bed of the truck for applying a fast push to the bed of the truck and directed substantially transversely of the bed, the period of the push such that the entire bed moves substantially as a single unit, detecting means secured at the other lateral side of the bed of the rtuck and measuring means measuring the detected effect of said push on the bed of the truck in terms of the weight of loads imposed on the bed of the truck and responsive to said push.

4. A measuring device for determining the weight of loads imposed on the bed of a truck comprising means mounted at one lateral side of the bed of the truck for applying a fast push to the bed of the truck and directed substantially transversely to the bed of the truck, the push having a wave length equivalent to a wave length greater than twice the transverse dimension of the bed of the truck such that the entire truck bed moves substantially as a single unit, said push applying means including a trip hammer, a yielding elastic member secured to the bed of the truck and means for rapidly directing said trip hammer against said yielding elastic member; transducer detection means secured to the other lateral side of the truck bed for detecting the effect of said push on said truck bed with respect to an inertial mass and measuring means for measuring the effect of said push on said transducer detection means and reading in terms of the weight of loads imposed on said truck bed and responsive to said push.

References Cited

UNITED STATES PATENTS 2,305,783  12/1942  Heymann et al. _____ 73—67
2,768,524  10/1956  Beard _____ 73—67
3,329,024   7/1967  Cumpston _____ 73—432

RICHARD C. QUEISSER, *Primary Examiner.*

C. I. McCLELLAND, *Assistant Examiner.*